US007010129B1

(12) United States Patent
Schaaf et al.

(10) Patent No.: US 7,010,129 B1

(45) Date of Patent: Mar. 7, 2006

(54) METHOD AND DEVICE FOR OPERATING VOICE-CONTROLLED SYSTEMS IN MOTOR VEHICLES

(75) Inventors: Klaus Schaaf, Braunschweig (DE); Juergen Schultz, Weyhausen (DE); Volker Thoermann, Salzgitter (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/674,839

(22) PCT Filed: May 4, 1999

(86) PCT No.: PCT/EP99/03031

§ 371 (c)(1),
(2), (4) Date: Nov. 6, 2000

(87) PCT Pub. No.: WO99/57938

PCT Pub. Date: Nov. 11, 1999

(30) Foreign Application Priority Data

| | | |
|---|---|---|
| May 6, 1998 | (DE) | 198 20 000 |
| Jun. 18, 1998 | (DE) | 198 27 134 |

(51) Int. Cl.

| | |
|---|---|
| ***H04B 15/00*** | (2006.01) |
| ***H04B 1/00*** | (2006.01) |
| ***H04R 3/00*** | (2006.01) |
| ***G10L 21/00*** | (2006.01) |

(52) U.S. Cl. ............................ 381/93; 381/95; 381/96; 381/86; 704/270

(58) Field of Classification Search ................ 704/200, 704/275, 271, 239; 381/83, 103, 98, 93; 379/410, 406; 455/51.9

See application file for complete search history.

(56) References Cited

U.S. PATENT DOCUMENTS

| | | | | |
|---|---|---|---|---|
| 4,965,833 A | | 10/1990 | McGregor et al. | |
| 5,627,899 A | * | 5/1997 | Craven et al. | 381/98 |
| 5,644,641 A | * | 7/1997 | Ikeda | 381/94.1 |
| 5,699,480 A | | 12/1997 | Martin | |
| 5,893,056 A | * | 4/1999 | Saikaly et al. | 704/226 |
| 5,920,834 A | * | 7/1999 | Sih et al. | 704/233 |
| 6,098,040 A | * | 8/2000 | Petroni et al. | 704/234 |

FOREIGN PATENT DOCUMENTS

| | | |
|---|---|---|
| DE | 422 78 26 | 2/1973 |
| DE | 37 42 929 | 9/1988 |
| DE | 39 25 589 | 2/1991 |
| DE | 42 03 436 | 8/1992 |
| DE | 42 27 826 | 2/1993 |
| DE | 41 06 405 | 2/1996 |
| DE | 689 22 426 | 2/1996 |
| DE | 195 24 847 | 2/1997 |
| DE | 195 248 47 | 2/1997 |
| DE | 197 05 471 | 7/1997 |
| EP | 0 078 014 | 5/1983 |
| EP | 0 304 257 | 2/1989 |
| JP | 62 018836 | 1/1987 |
| WO | WO 97/34290 | 9/1997 |

* cited by examiner

*Primary Examiner*—W. R. Young
*Assistant Examiner*—Brian L. Albertalli
(74) *Attorney, Agent, or Firm*—Kenyon & Kenyon

(57) ABSTRACT

A device for operating voice-controlled systems, such as communication and/or intercommunication systems in motor vehicles, includes a plurality of microphones and at least one loudspeaker. Voice signals received by the microphones are transmitted to the at least one loudspeaker. The voice signals are subjected to a low-value frequency shift before being transmitted to the loudspeaker(s) or to the input of a voice-controlled device to thereby suppress feedback.

14 Claims, 1 Drawing Sheet

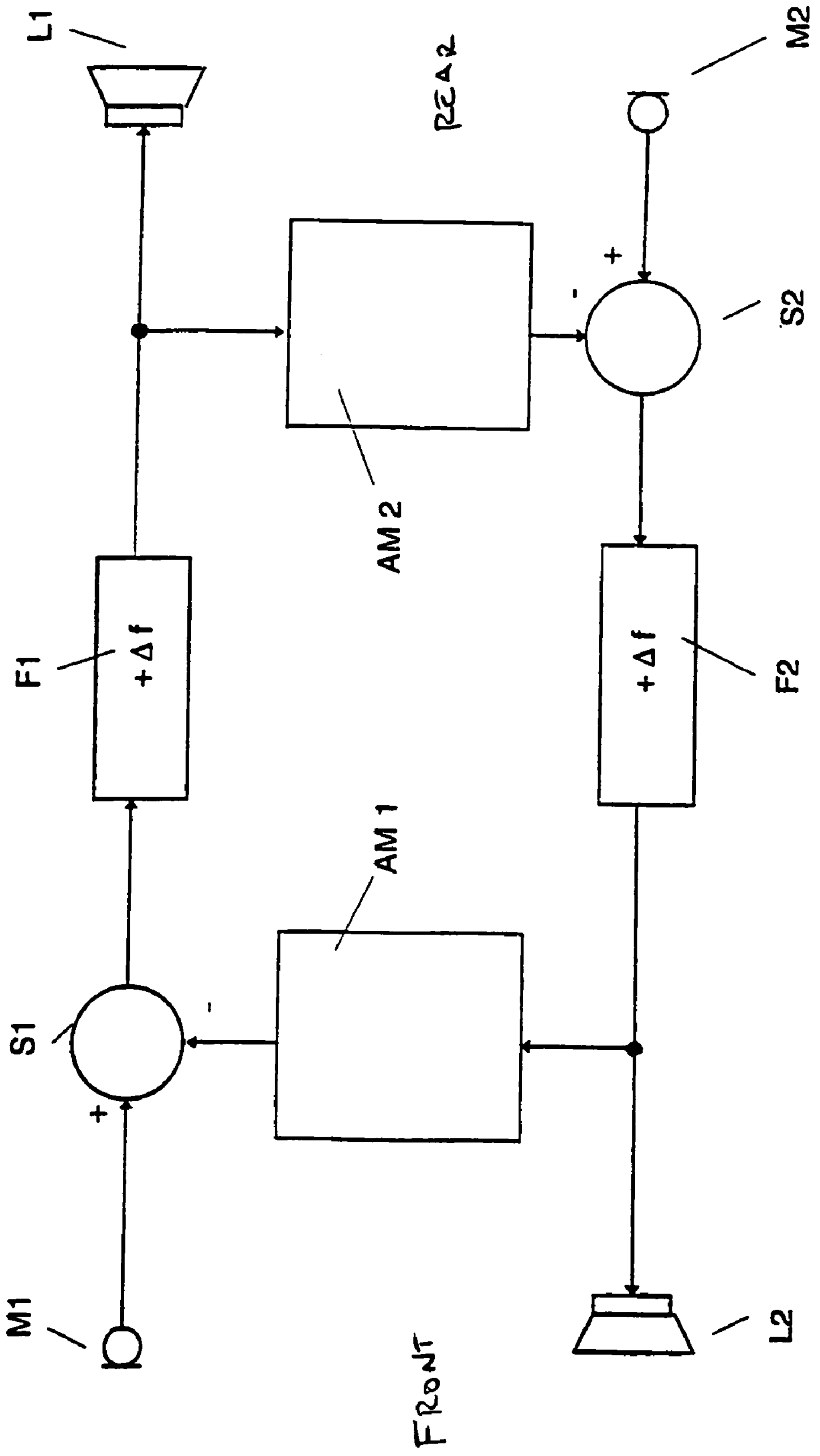
L1
REAR
M2
+
-
S2
AM 2
F1
+ Δ f
F2
+ Δ f
AM 1
S1
-
+
M1
L2
FRONT

METHOD AND DEVICE FOR OPERATING VOICE-CONTROLLED SYSTEMS IN MOTOR VEHICLES

FIELD OF THE INVENTION

The present invention relates to a method and a device, for operating voice-controlled systems, such as communication and/or one-way/two-way intercom devices in motor vehicles, where voice signals are picked up by a multiple microphone system and transmitted to at least one loudspeaker.

BACKGROUND INFORMATION

On the one hand, methods of this type are used in motor vehicles for voice- controlled intercom operation, but they are also used for supporting voice-input controlled electronic or electric modules. In this case, the fundamental problem is that, depending on the operating state, corresponding background noise is present in the motor vehicle. This background noise masks the voice commands. One- and two-way intercom systems in motor vehicles are advantageous in large vehicles, minibusses, and the like. However, they can also be used in normal passenger cars. Suppressing background noise or filtering out the voice command is still very important in the use of voice-controlled input units for electric components in the vehicle.

A voice-recognition device for a motor vehicle is described, for example in European Patent No. 0 078 014, where sensors signal or feed into the amplifier system of the voice- recognition device, whether or not the engine is running and/or the vehicle is moving. This device guides a level control, by which it is attempted to isolate the voice command from the background noise.

German Patent No. 37 42 929 describes a system having two microphones, one of the microphones being disposed at the mouth of the operator, and another in proximity, which is, however, for picking up the structure-borne noise. Both microphone signals are triggered so, that structure-borne noise can be subtracted from the total noise.

German Published Patent Application No. 197 05 471 describes a voice-recognition system using transverse filtering. In this case, a frequency analysis is performed, which is only used for the purpose of recognizing speech commands. No ambient-noise compensation is performed.

Filtering is described in International Patent Publication No. WO 97/34290, in which periodic interference signals are filtered out by ascertaining their periods and canceling them out by interference, using a generator, so that the voice signal remains.

German Patent No. 41 06 405 describes a method in which noise is subtracted from the voice signal, a plurality of microphones being used.

The use of a multiple microphone array is known from described in German Published Patent Application No. 39 25 589. When using the array in the motor vehicle, one of the microphones is disposed in the engine compartment and another microphone is disposed in the passenger compartment. Both signals are then subtracted. A disadvantage in this case, is that only the engine noise i.e. the actual operational noise of the vehicle itself, is subtracted from the total signal in the passenger compartment. Specific ambient noises are not, however, considered. The lack of feedback suppression presents a special problem. Wherever microphones and loudspeakers are arranged in acoustically coupleable proximity, the acoustic signal decoupled at the loudspeaker is fed back into the microphone. This results in so-called feedback and a subsequent overload.

German Published Patent Application No. 39 25 589 also describes a method, in which a composite signal is formed. The composite signal includes a voice signal and an external noise signal. A detection of the external noise is performed separately. The external noise and voice signals are filtered and subtracted from the composite signal. The results is used to control the filter. This method, however, cannot effectively prevent the occurrence of an echo and/or feedback.

A similar method is known from DE 39 25 589 A1, where a composite signal made of a voice signal and an external signal is formed. The additional picking-up of external noise takes place separately. The external-noise and voice signals are lead over a filter and are subtracted from the composite signal. Then, the result of the comparison controls the filter. A method of this type cannot effectively prevent the Therefore, it is an object of the present invention to provide a method and device for operating voice-controlled systems in motor vehicles so that instances of feedback and

SUMMARY

Regarding a device of the species, the stated object of the present invention is achieved by the characterizing features of claim 5. Advantageous further refinements of the device according to the present invention are specified in the remaining claims.

With regard to both the method and the device, the present invention is based on a communication and/or one-way/two-way intercom device in motor vehicles. A multiple microphone system is provided to pick up both voice and noise signals. Noise signals are subtracted from the total signal, so that the filtered voice signal remains.

The present invention includes initially shifting the frequency of the specific microphone signal by a small amount $\Delta$ F, and only then transmitting the microphone signal to the loudspeaker(s) or to the input of a voice-controlled device. The frequency shift of the present invention, which is performed at a defined position and is not arbitrary, supports the filtering on the one hand, and decouples feedback, and therefore the echo signal, on the other hand. This result is achieved by subtracting the composite signal shifted by $\Delta$ F of another, i.e., a second, microphone from the composite signal of a first microphone, the frequency of which has not yet been shifted, and vice versa.

Since, without the aforesaid frequency shift of the present invention, feedback is nothing more than the, fed-back, amplified voice signal, such feedback cannot be eliminated by conventional systems and procedures. This is therefore the case, because devices conventional only separate the voice signal from the noise signal, and identify the fed-back signal as a voice signal, and not as a noise signal. For this reason, the aforesaid instances of feedback cannot be controlled by the conventional systems and methods and cannot be controlled simultaneously.

In contrast, the method and the device of the present invention, the latter of which relates to the connection of the individual elements to one another, eliminate feedback effects in simple and efficient manner.

Since feedback, always occurs when the microphone and loudspeaker locations are close together, a generally occurs in motor vehicles, the elimination of this feedback is very important. This is not only valid in the case of intercom operation, where electroacoustical feedback is uncomfortable for the passengers, but it also has special significance in the use of voice-controlled input interfaces of electrical or electronic components on the vehicle. This only applies when the entire system in the vehicle includes both microphones and loudspeakers, and in this case, also when the input to electrical devices is voice-controlled. Feedback and resulting overloads can cause considerable malfunctions and misinterpretations of the voice command, even in the case of intelligent input interfaces. Depending on the application, this also constitutes a safety hazard. As an option, noise reduction can also be implemented at the same time, i.e., simultaneously.

The present invention is represented in the drawing, and subsequently described in detail.

BRIEF DESCRIPTION OF THE DRAWING

The FIGURE is a schematic view of a device for operating voice-controlled systems in motor vehicles according to the present invention.

DETAILED DESCRIPTION

In the illustrated exemplary embodiment of the present-invention, the vehicle interior is subdivided into two subspaces, namely front and rear.

A microphone M 1 and a loudspeaker L 2 are located in the front section. Microphone M 1 picks up the voice signal, and possibly picks up noise signals as well. In this case, the noise signal is made up of the background noise in the passenger compartment, which occurs while operating the vehicle. This background noise may include engine noises, wind noises, rolling noises, but also acoustical echo signals from the other subspace, and the like. The composite signal (total signal) (total signal) detected at M 1, which may include of background speech and background noise, is fed to a first summation point S 1. Then, a correspondingly conditioned signal from an acoustic model AM 1 in front is also fed to this summation point. In this exemplary embodiment, the subtraction signal generated in acoustic model AM 1 originates from the signal, which is obtained in the rear section of the vehicle, and is already shifted in frequency. Because this signal, which comes from M 2, is frequency-shifted in F 2, and originates from the rear subspace of the passenger compartment, is also taken into account in front on a signal basis, by AM 1, the signal, which is generated in the rear subspace of the vehicle, is acoustically transported up front, into the front subspace of the passenger compartment, and is also registered by M 1, is subtracted again at summation point S 1. Thus, the rear subspace of the passenger compartment is acoustically separated from the front subspace of the passenger compartment by device AM 1. That is, the total detectable acoustical signal is initially fed into M 1, and the echo from the rear subspace of the passenger compartment is initially subtracted at summation point S 1. The original signal from the front subspace of the passenger compartment, which is obtained from M 1 in this manner, is then supplied to a frequency-shifting device F 1, and shifted by an amount A F, e.g. 5 Hz. The F 1 output signal obtained in this manner is then supplied to loudspeaker L 1 of the rear passenger-compartment subspace and, on the other hand, is simultaneously fed into device AM 2 in the same manner. In this case, AM 2 again represents the acoustic model for the rear subspace of the passenger compartment. A voice message is transmitted in an analogous manner from the rear subspace of the passenger compartment, via M 2, to the front subspace of the passenger compartment, via L 2. That is, microphone M 2 registers the voice message together with the background noise in the rear subspace of the passenger compartment, and transmits them to summation point S 2, which the total acoustical signal picked up by M 1, i.e., the echo as well as ambient noises, is subtracted. In turn, the echo-free signal from microphone M 2, which is generated in this manner, is then supplied to a frequency-shifting device F 2, as well, which again shifts the frequency by an amount Δ F. At the output of this frequency-shifting device F 2, the result, i.e., the signal conditioned in this manner, is again supplied to the front subspace of the passenger compartment, namely to loudspeaker L 2 positioned there. The frequency shift for the transmission from the front to the rear can also be different from the frequency shift from the rear to the front.

All in all, the result is a closed, feedback-free system. The shifting of the frequency is an important feature here, and the echo from the front to the rear subspace, and vice versa, is eliminated by the interaction with the connection via acoustic models AM 1 and AM 2.

However, it is also possible to add a noise-signal subtraction to the echo suppression and feedback elimination. This can also be appropriately taken into consideration in the specific acoustic model AM 1 and AM 2. The additional components necessary for this purpose, such as noise-signal microphones, are not shown here in further detail.

Therefore the total background noise signal, which may include an echo and/or other noises, is subtracted from every from every acoustical input signal from M 1 and M 2, before it is processed further and fed to loudspeakers L 2 and L 1, respectively. So not only does an acoustic decoupling occur between the front and rear subspaces of the passenger compartment, but also the remaining noise signals are quasi compensated for, or subtracted, in the same step.

The invention claimed is:

1. A method for operating a voice-controlled system in a motor vehicle, comprising the steps of:

detecting a total signal by a plurality of microphones, the total signal including a voice signal and a background noise signal;

performing a frequency shift by an amount of Δ F on the total signal detected by each microphone;

subtracting the frequency-shifted total signal of a first one of the plurality of microphones from the detected total signal of a second one of the plurality of microphones before shifting the frequency of the total signal of the second one of the plurality of the microphones and vice versa; and transmitting the frequency-shifted total signal to one of an input to a voice-controlled device and at least one loudspeaker.

2. The method according to claim 1, wherein the voice-controlled system includes at least one of a communication device and a two-way intercom device.

3. The method according to claim 1, further comprising the steps of:

defining an arbitrary acoustic model based on the detected total signals; and transmitting a signal corresponding to the acoustic model to a respective summation point for subtraction from the detect total signal before the respective frequency shifting.

4. The method according to claim 3, wherein a passenger compartment of the motor vehicle is divided into at least two acoustic subspaces, each of the acoustic subspaces including at least one microphone location and at least one loudspeaker location;

and wherein the frequency shift is performed between the microphone location of one of the subspaces and the loudspeaker location of another one of the subspaces;

and wherein each acoustic model is defined between the microphone location and the loudspeaker location of the respective acoustic subspace to thereby form a signal-based, closed loop electroacoustical control circuit.

5. The method according to claim 4, wherein each acoustic model is defined in accordance with voice and noise signals detected in the respective acoustic subspace and additional noise signals detected in the entire passenger compartment so that after the signal corresponding to the acoustic model is subtracted from the total signal substantially only the voice signal remains.

6. A device for operating a voice-controlled system in a motor vehicle, the motor vehicle including a passenger compartment divided into at least two subsections, each subsection including at least one microphone and at least one loudspeaker, the device comprising:

a transmitter for transmitting at least one of voice messages and voice commands;

a frequency-shifting device connected between the microphones of one of the subsections and the loudspeakers of another one of the subsections; and a summation point corresponding to each subsection, the summation point subtractively superimposing a parallelly tapped loudspeaker signal and the microphone signal of the respective subsection.

7. The device according to claim 6, wherein the voice-controlled system includes at least one of a communication device and a two-way intercom device.

8. The device according to claim 6, wherein the subsections are open subsections.

9. The device according to claim 6, further comprising an acoustic model generator provided between each parallel tapped loudspeaker signal and the respective summation point, the acoustic models generated at least one of controlling and postprocessing the respective loudspeaker signal, a resulting signal from each acoustic model generator being transmitted to the respective summation point.

10. The device according to claim 9, wherein the acoustic model generators include sound pattern detectors for separating engine and driving noises from speech-generated acoustical signals and for separating speech-generated signals from fed-back echo signals.

11. A method for operating a voice-controlled system in a motor vehicle, comprising the steps of:

detecting a total signal by a plurality of microphones, the total signal including a voice signal and a background noise signal;

performing a frequency shift by an amount of $\Delta F$ on the total signal detected by each microphone;

subtracting the frequency-shifted total signal of a first one of the plurality of microphones from the detected total signal of a second one of the plurality of microphones before shifting the frequency of the total signal of the second one of the plurality of the microphones and vice versa; and transmitting the frequency-shifted total signal to one of an input to a voice-controlled device and at least one loudspeaker, wherein $\Delta F$ is 5 Hz.

12. A method for operating a voice-controlled system in a motor vehicle, comprising the steps of:

detecting a total signal by a plurality of microphones, the total signal including a voice signal and a background noise signal;

performing a frequency shift by an amount of $\Delta F$ on the total signal detected by each microphone;

subtracting the frequency-shifted total signal of a first one of the plurality of microphones from the detected total signal of a second one of the plurality of microphones before shifting the frequency of the total signal of the second one of the plurality of the microphones and vice versa; and transmitting the frequency-shifted total signal to one of an input to a voice-controlled device and at least one loudspeaker, wherein the frequency shift performed on the total signal of the first microphone is by a first amount $\Delta F$, and the frequency shift performed on the total signal of the second microphone is by a second amount $\Delta F$ different than the first amount $\Delta F$.

13. A device for operating a voice-controlled system in a motor vehicle, the motor vehicle including a passenger compartment divided into at least two subsections, each subsection including at least one microphone and at least one loudspeaker, the device comprising:

a transmitter for transmitting at least one of voice messages and voice commands;

a frequency-shifting device connected between the microphones of one of the subsections and the loudspeakers of another one of the subsections; and a summation point corresponding to each subsection, the summation point subtractively superimposing a parallelly tapped loudspeaker signal and the microphone signal of the respective subsection, wherein the frequency-shifting device is configured to perform a frequency shift by an amount of $\Delta F$ on each microphone signal.

14. The device according to claim 13, wherein $\Delta F$ is 5 Hz.

* * * * *

UNITED STATES PATENT AND TRADEMARK OFFICE
CERTIFICATE OF CORRECTION

PATENT NO. : 7,010,129 B1

APPLICATION NO. : 09/674839
DATED : March 7, 2006
INVENTOR(S) : Klaus Schaaf et al.

It is certified that error appears in the above-identified patent and that said Letters Patent is hereby corrected as shown below:

Column 1, line 7, change “and a device,” to --and a device--

Column 1, line 17, change “for voice- controlled” to --is evaluated, and--

Column 1, line 40, change “triggered so, that” to --triggered so that--

Column 1, line 56, delete “known from”

Column 1, line 61, change “this case, is i.e. the actual” to --this case is i.e., the actual--

Column 2, line 8, change “The results is used” to --The results are used--

Column 2, line 11, change “DE 39 25 589 A” to --German Published Patent Application No. 39 25 589--

Column 2, line 15, change “are lead over a filter” to --are led over a filter--

Column 2, line 17, change “prevent the” to --prevent the occurrence of echoes and feedback.--

Column 2, line 20, change “of feed back and” to --of feedback and instability occurring in a in a system of multiple microphones and loudspeakers are suppressed.--

Column 2, line 51, change “devices conventional,” to --conventional devices--

Column 2, line 55, change “the conventional systems” to --conventional systems--

Column 2, line 60, change “in simple and efficient manner.” to --in a simple and efficient manner.--

Column 2, line 62, change “a generally occurs” to --as generally occurs--

Column 3 line 11, change “in the drawing, and” to --in the drawing and--

Column 3, line 33, delete second occurrence “(total signal)”

UNITED STATES PATENT AND TRADEMARK OFFICE

CERTIFICATE OF CORRECTION

PATENT NO. : 7,010,129 B1
APPLICATION NO. : 09/674839
DATED : March 7, 2006
INVENTOR(S) : Klaus Schaaf et al.

It is certified that error appears in the above-identified patent and that said Letters Patent is hereby corrected as shown below:

Column 3, line 34, change "includes of background speech" to --includes background speech--

Column 3, line 57, change "e.g. 5 Hz." to --e.g., 5Hz--

Column 4, line 2, change "S 2, which" to --S 2, at which--

Column 4, line 27, delete "from which"

Column 4, line 34, change "The invention claimed is:" to --what is claimed is:--

Signed and Sealed this

Fifteenth Day of January, 2008

JON W. DUDAS
*Director of the United States Patent and Trademark Office*